(12) United States Patent
Bauer

(10) Patent No.: US 11,225,139 B2
(45) Date of Patent: Jan. 18, 2022

(54) POWER TAKE-OFF TRANSMISSION AND AGRICULTURAL MACHINE

(71) Applicant: ZF Friedrichshafen AG, Friedrichshafen (DE)

(72) Inventor: Christoph Bauer, Windorf (DE)

(73) Assignee: ZF FRIEDRICHSAFEN AG, Friedrichshafen (DE)

( * ) Notice: Subject to any disclaimer, the term of this patent is extended or adjusted under 35 U.S.C. 154(b) by 77 days.

(21) Appl. No.: 16/416,464

(22) Filed: May 20, 2019

(65) Prior Publication Data
US 2019/0366841 A1 Dec. 5, 2019

(30) Foreign Application Priority Data
Jun. 5, 2018 (DE) .................... 10 2018 208 817.9

(51) Int. Cl.
*B60K 17/28* (2006.01)
*F16H 61/32* (2006.01)
*B60W 30/188* (2012.01)

(52) U.S. Cl.
CPC ......... *B60K 17/28* (2013.01); *B60W 30/1888* (2013.01); *F16H 61/32* (2013.01); *B60Y 2300/1888* (2013.01); *B60Y 2400/795* (2013.01)

(58) Field of Classification Search
CPC ......... B60K 17/28; B60K 25/06; F16H 61/32; F16H 63/30; F16H 63/304; B60Y 2300/1888; B60Y 2400/795; B60W 30/1888; A01D 69/002
USPC ....... 74/15.4, 11; 180/53.7, 53.1, 53.2, 53.3, 180/53.4, 53.5, 53.8, 53.6, 53.61, 53.62
See application file for complete search history.

(56) References Cited

U.S. PATENT DOCUMENTS

| | | | |
|---|---|---|---|
| 8,850,910 B1* | 10/2014 | Have ..................... | A01K 5/001 74/22 A |
| 2010/0036569 A1* | 2/2010 | Hei ..................... | A01B 61/025 701/50 |

* cited by examiner

*Primary Examiner* — Keith J Frisby
(74) *Attorney, Agent, or Firm* — Finch & Maloney, PLLC

(57) ABSTRACT

A power take-off transmission (1), for a motor vehicle, having a power take-off shaft (5), a transmission housing (3), at least two shiftable gears and at least one actuator for engaging the at least two gears. The at least one actuator has an actuating linkage (6) for mechanical actuation from outside the transmission housing (3). The actuating linkage (6) of the power take-off transmission (1) is coupled to an electric motor (8) located outside the transmission housing (3) and by which the at least one actuator can be actuated mechanically. The power take-off transmission can be installed on an agricultural working machine.

10 Claims, 2 Drawing Sheets

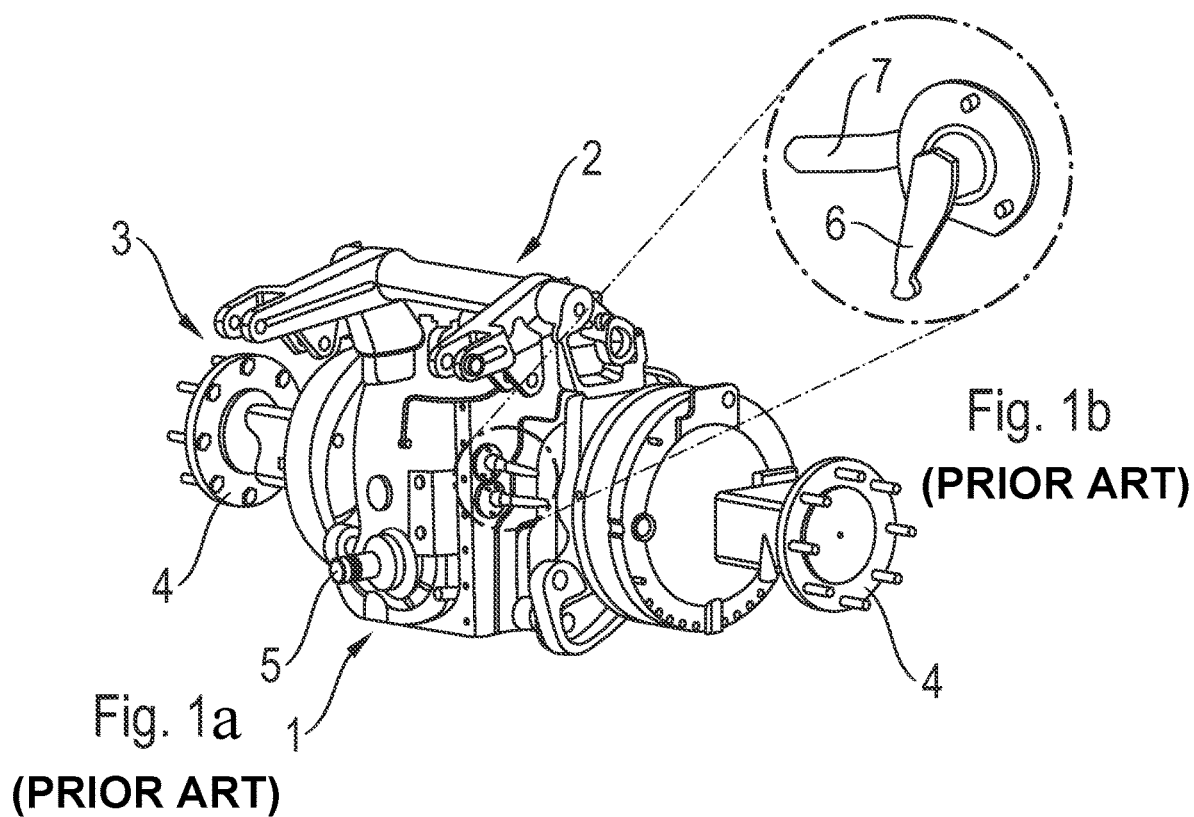
Fig. 1a (PRIOR ART)
Fig. 1b (PRIOR ART)
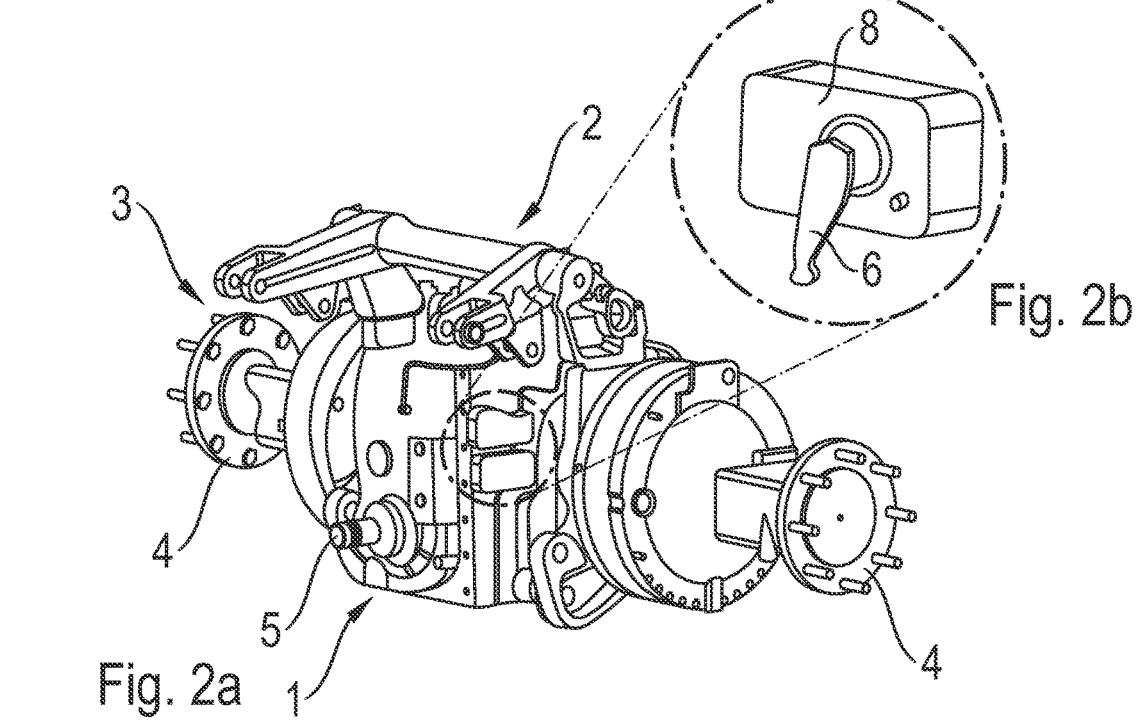
Fig. 2a
Fig. 2b

POWER TAKE-OFF TRANSMISSION AND AGRICULTURAL MACHINE

This application claims priority from German patent application serial no. 10 2018 208 817.9 filed Jun. 5, 2018.

FIELD OF THE INVENTION

The invention relates to a power take-off transmission and an agricultural machine.

BACKGROUND OF THE INVENTION in the prior art, particularly for agricultural machines, power take-off shafts are known, which enable the powering of drivable working devices that can be coupled to the working machines. Examples of such drivable working devices are perhaps mowers, straw balers or fertilizer spreaders. In such cases the output rotational speed of the power take-off shaft usually depends on the motor rotational speed of the agricultural working machine concerned, and on a gear engaged in a power take-off transmission. A typical power take-off transmission comprises up to four gears. As a rule the four gears are standardized gears, which are generally known under the designations "540", "540E", "1000" and "1000E".

In this connection a power take-off transmission for an agricultural working machine is known to the applicant, whose four gears can be engaged by way of two mechanical levers which can be actuated from the driver's cabin via Bowden cables.

Furthermore a power take-off transmission for an agricultural working machine is known to the applicant, whose four gears can be engaged by electro-hydraulic means from the driver's cabin. In this case, compared with purely mechanical actuation of the power take-off transmission the electro-hydraulic actuation provides comparatively greater comfort for the operator and avoids erroneous operation, since the respective gear engaged is detected and monitored electronically.

However, the known power take-off drives have disadvantages in that, in the mechanically actuated versions, they offer only little comfort and can also be damaged due to erroneous operations that cannot be excluded, for example when an operator tries to engage two gears simultaneously. Although the electro-hydraulically actuated version overcomes the disadvantages of the mechanically actuated version, it is comparatively expensive and takes up a comparatively large amount of space, which again affects its market acceptance adversely.

SUMMARY OF THE INVENTION

The purpose of the present invention is to propose an improved power take-off transmission.

According to the invention, this objective is achieved by the power take-off transmission according to the independent claim(s). Advantageous design features and further developments of the invention emerge from the dependent claims.

The invention relates to a power take-off transmission for a motor vehicle, comprising a power take-off shaft, a transmission housing, at least two shiftable gears and at least one actuator for engaging the at least two gears, wherein the at least one actuator has an actuating linkage for mechanical actuation from outside the transmission housing. The power take-off transmission according to the invention is characterized in that the actuating linkage is coupled to an electric motor outside the transmission housing, by means of which the at least one actuator can be actuated mechanically.

Thus, the at least two shiftable gears of the power take-off transmission according to the invention are engaged by a mechanically actuated actuator. In turn, the actuator can be mechanically actuated via the actuating linkage, which extends out of the transmission housing. According to the invention, this mechanical actuation from outside the transmission housing takes place by means of an electric motor. Consequently, the electric motor adopts the function of a usually present mechanical actuating lever, which according to the prior art is coupled to the actuating linkage and actuates the actuator.

Thus, the invention starts from a simple, robust and inexpensive mechanical system and upgrades it with the advantages of an electrical or electronic control system for the power take-off transmission. The additional cost of the electric motor according to the invention compared with the purely mechanical design with no electric motor, is comparatively small. In fact, most of the additional cost for the electric motor is already compensated for by the fact that other components, such as a Bowden cable and a mechanical actuating lever for the operator, as well as a further mechanical actuating lever for the actuating linkage, are no longer needed. In any case, the cost of the power take-off transmission according to the invention is substantially lower than that of known electro-hydraulically actuated power take-off transmissions. Yet, depending on the design of the corresponding software, the power take-off transmission according to the invention offers the same shifting comfort and the same security against erroneous actuations as the known electro-hydraulically actuated power take-off transmissions. Moreover, the fitting space required for a power take-off transmission according to the invention is almost identical to that for a purely mechanically actuated power take-off transmission, since the space taken up by the electric motor and the additional wiring corresponds approximately to the space occupied by the actuating lever for the actuating linkage and the space for the Bowden cable.

A further advantage of the invention can be considered to be that the later upgrading of a purely mechanical power take-off transmission already in operation can be carried out even subsequently without particular effort and only little cost, to an electrically or electronically shiftable power take-off transmission. In that case the simple and robust structure of the mechanical power take-off transmission is preserved. At the same time the already described advantages of an electrically or electronically shifted power take-off transmission are added thereto.

Accordingly, an aspect of the invention also relates to the upgrading of an already present, purely mechanical power take-off transmission to a power take-off transmission according to the invention. Instead of having to buy a new, electro-hydraulically actuated power take-off transmission, it is thus possible to upgrade an already existing purely mechanical power take-off transmission to a power take-off transmission which is functionally identical to the electro-hydraulically actuated power take-off transmission. This represents a very considerable cost saving.

Expediently, its is provided that for each actuator there is a separate actuating linkage.

Likewise, it is expedient to provided for each actuating linkage an electric motor for its mechanical actuation, such that mechanical actuation of the actuating linkage results in mechanical actuation of the actuator.

Moreover, it is preferably provided that in addition a neutral position of the power take-off transmission is also available. This makes it possible to engage the power take-off shaft without drive power.

The actuating linkage is preferably in the form of a lever arm which can actuate the actuator along an axis. Actuation of the actuator then preferably involves linear displacement of the actuator along an axis, in particular along a mechanical rail.

For its part, the actuator is preferably in the form of a shifting claw or a shifting sleeve, or a combination of a shifting claw and a shifting sleeve, and is arranged in the power take-off transmission in such manner that it can actuate a gearwheel or two gearwheels. Advantageously, the gearwheels are actuated in such manner that in each case only one of the gearwheels at a time can be engaged.

The electric motor can be coupled to the actuating linkage for example by means of a step-up gear, with a motor shaft of the electric motor coupled to the actuating linkage so that rotation of the motor shaft is converted into rotation of the actuating linkage. Alternatively, the actuating linkage can also be coupled directly to the motor shaft in a rotationally fixed manner. In principle, here too quite different types of couplings are conceivable, provided only that the rotation of the motor shaft leads to rotational or at least to translational movement of the actuating linkage.

Preferably, the power take-off transmission has more than two shiftable gears, more than one actuator, more than one actuating linkage and more than one electric motor, such that for each shiftable gear an actuator, an actuating linkage and an electric motor is provided.

The motor vehicle is preferably an agricultural working machine.

According to a preferred embodiment of the invention, it is provided that the electric motor is in the form of a servomotor. Servomotors are special electric motors which allow checking the angular position of their motor shaft as well as the rotational speed and the rotational acceleration. They usually consist of an electric motor additionally equipped with a position-determining sensor. The rotational position of the motor shaft determined by the sensor is continuously transmitted to a control electronic unit as a rule attached outside the motor itself, which for example can be integrated in a transmission control unit of the power take-off transmission.

In a preferred embodiment of the invention, it is provided that the power take-off transmission comprises a transmission control unit designed to control the electric motor. Particularly preferably, the transmission control unit is a transmission control unit of a driving transmission or a main transmission which is present in any case, which can be functionally extended in order to control the electric motor of the power take-off transmission. Since the transmission control unit therefore in any case comprises hardware suitable for controlling the electric motor, such as a microcontroller and current driver, by installing appropriate software the transmission control unit can in a simple way be enabled to control the electric motor. This eliminates the need to provide a separate control unit for controlling the electric motor, which in turn makes the power take-off transmission according to the invention comparatively inexpensive.

In a particularly preferred embodiment of the invention it is provided that the transmission control unit is designed to read a set position of the electric motor. Thus, there is no need for separate sensors for detecting the position of the at least one actuator, since the position of the at least one actuator can be determined by way of the set position of the servomotor. In turn, from the position of the at least one actuator, the respective engaged gear or an engaged neutral position can advantageously be determined. From the electronic detection of the respective gear engaged, in turn the further advantage is obtained that erroneous operations by the operator can be prevented by the transmission control unit, for example since the transmission control unit disallows a shifting process called for by an operator if that process could result in damage to the power take-off transmission.

Further advantages obtained from the electronic reading-out of the set position of the electric motor lie in the much greater potential, compared with the purely mechanically actuated version, for further comfort functions. For example, it is conceivable to have an active cooling system for cooling a clutch of the power take-off transmission between two starting operations of the power take-off transmission. It is also conceivable to provide a coupling assistance function when coupling attached equipment to the power take-off shaft, in the form of automated rotation of the power take-off shaft to a required coupling orientation of the power take-off shaft. Usually, coupling of attached equipment is only possible when the power take-off shaft of the power take-off transmission and a drive input shaft of the attached equipment have the same angular orientation. Thus, laborious manual orientation is no longer necessary. This increases the comfort that can be provided for the operator.

In a further particularly preferred embodiment of the invention, it is provided that the transmission control unit is designed to prevent erroneous operation of the power take-off transmission. As has already been described, the electronic detection of the respective gear engaged in principle enables erroneous operations to be prevented. Since this is now prevented in actual fact, which takes place by virtue of appropriate programming of the transmission control unit, damage of the power take-off transmission that results from such erroneous operation can be reliably avoided. Moreover, since the erroneous operation is prevented alone by appropriate programming of the transmission control unit, the additional costs incurred for realizing this ability are comparatively low.

According to another preferred embodiment of the invention it is provided that the actuating linkage is designed to bring about rotational or translational actuation. Depending on the specific structure of the actuator to be actuated or that of the power take-off transmission to be engaged, the actuator can be actuated by rotational or translational movement of the actuating linkage. In this context, rotational movement or actuation is understood to mean rotation movement of the actuating linkage along part of a circle. On the other hand, translational movement is understood to mean displacement of the actuating linkage along an axis. Advantageously, it is also conceivable to allow the actuating linkage to undergo rotational movement which, however, is converted into translational movement or actuation of the at least one actuator by an arrangement of the at least one actuator such that it can move in an exclusively linear manner, for example along a rail.

In a further preferred embodiment of the invention, it is provided that the power take-off transmission has four gears, two actuators, two actuating linkages and two electric motors, Such a design form enables the realization, particularly for the agricultural sector, of the gears typically found in power take-off transmissions and usually denoted as "540", "540E", "1000" and "1000E", and has been found to be particularly suitable for everyday practical use. In such a configuration each electric motor actuates an actuating linkage, which in turn actuates an actuator, which for its part can engage two gears.

Preferably, in addition two neutral positions are provided, one for each actuator. Thus, one actuator can be brought to its neutral position while the other actuator engages a gear. Likewise both actuators can be brought to their neutral positions, in order to enable idling of the power take-off transmission.

According to a further preferred embodiment of the invention it is provided that together with the power take-off transmission a driving transmission is arranged in the transmission housing. In that way a separate housing for the power take-off transmission can be saved, which again reduces costs and weight. Furthermore, the drive power required for driving the power take-off transmission can advantageously be taken from a shaft of the driving transmission.

In another preferred embodiment of the invention it is provided that the power take-off shaft can be used alternatively as a power take-off shaft and a trunnion shaft. Here, a power take-off is usually used for operating attached equipment such as mowers, straw balers or fertilizer spreaders. In contrast, a trunnion shaft serves to power a trailer wagon in order to increase the traction of the combination as a whole, Thanks to the alternative use of the power take-off transmission as a power take-off and a trunnion shaft, the power take-off transmission can be used in particularly flexible and versatile ways.

Preferably, it is provided that the power take-off transmission has at least one additional gear and the corresponding number of necessary actuators, actuating linkages and electric motors when it is designed to be used alternatively as a power take-off and as a trunnion shaft. In that case the at least one additional gear serves to produce a rotational speed of the power take-off shaft that enables the power take-off shaft to be used as a trunnion shaft.

The invention also relates to an agricultural working machine that comprises a power take-off transmission according to the invention. The use of the power take-off transmission according to the invention in the agricultural working machine leads to the advantages already described in connection with the power take-off transmission according to the invention.

BRIEF DESCRIPTION OF THE DRAWINGS

Below, an example of the invention is explained with reference to embodiments illustrated in the figures, which show:

FIGS. 1a and 1b: A known structural form of a power take-off transmission, and

FIGS. 2a and 2b: As an example, a structural form of a power take-off transmission according to the invention.

DETAILED DESCRIPTION OF THE PREFERRED EMBODIMENTS

Figure 3:
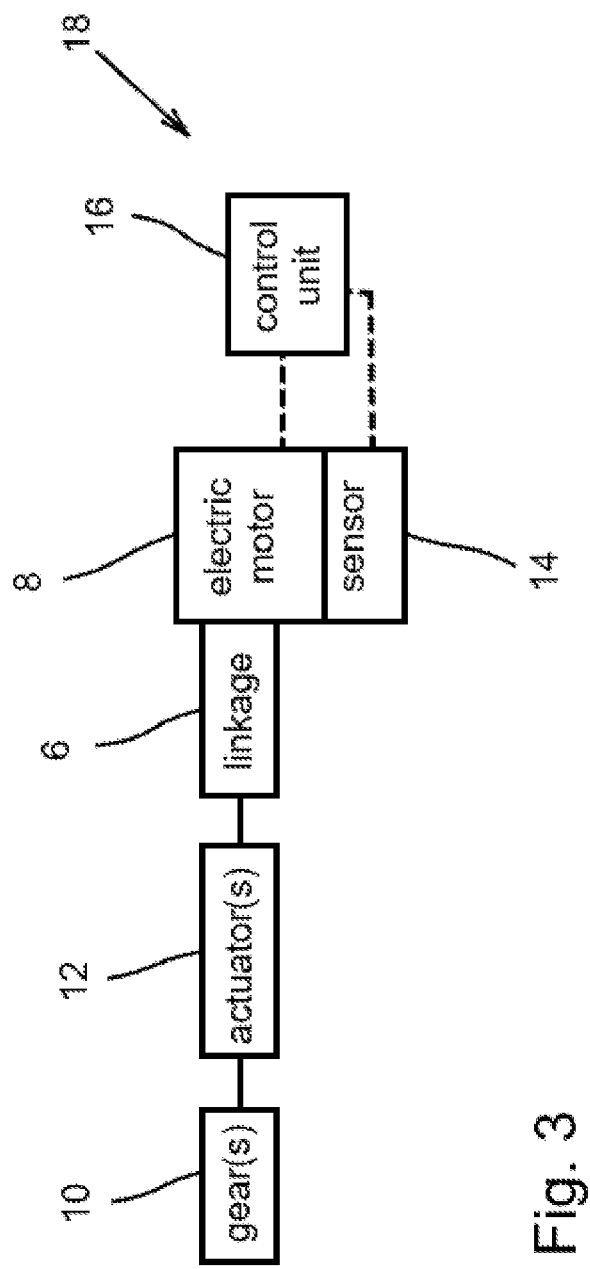
FIG. 3: A diagrammatic example of components of a power take-off transmission according to the invention.

The same objects, functional units and comparable components are denoted by the same indexes in both the figures. As regards their technical characteristics, these objects, functional units and comparable components are identically designed unless otherwise stated explicitly or by implication in the description thereof.

FIG. 1a shows a purely mechanically actuated power take-off transmission 1 known from the prior art, which is arranged together with a driving transmission 2 in a common housing 3. The driving transmission 2 takes up most of the fitting space available in the transmission housing 3 and is located essentially in the area between two drive output shafts 4. The power take-off transmission 1 is essentially in the middle between the drive output shafts 4, in the area of a power take-off shaft 5 made, for example, in the form of an auxiliary driveshaft 5. Besides the power take-off shaft 2 and the transmission housing 3, the known power take-off transmission 1 has four shiftable gears (not shown in FIG. 1a) and two actuators (also not shown in FIG. 1a) for engaging the four gears, Here, each actuator can engage two gears. In this example the actuators are in the form of shifting sleeves. In addition each of the actuators has an actuating linkage 6 that extends outside the transmission housing 3 (represented in the enlarged view shown in FIG. 1b). As can be seen, in this example the actuating linkage 6 is designed to bring about a rotational actuation. Rotational actuation is understood to mean rotation movement of the actuating linkage 6 along part of a circle. As can also be seen, the actuating linkage 6 is in the form of a lever arm 6 one end of which can actuate an actuator in the transmission housing 3 and the other end of which forms the mid-point for the rotary movement, i.e. the rotational actuation. The actuating linkage 6 is connected rotationally fixed to the lever 7, which is arranged outside the transmission housing 3. The lever 7 enables a purely mechanical actuation of the actuator, since it acts upon the actuating linkage 6. The lever 7 is actuated for example by a Bowden cable (not shown).

FIG. 2b shows as an example a structural form of a power take-off transmission 1 according to the invention. The power take-off transmission 1 of FIG. 2a corresponds in its essential features to the power take-off transmission 1 in FIG. 1a, in particular being similarly simply and robustly constructed as the power take-off transmission 1 of FIG. 1a. The difference from the power take-off transmission 1 of FIG. 1 is exclusively that according to the invention the power take-off transmission 1 of FIG. 2a has been upgraded by virtue of two electric motors 8 as shown in FIG. 2b that are located outside and supported on the transmission housing 3, each of them coupled to an actuating linkage 6 for the mechanical actuation of the actuators inside the transmission housing 3. Thus, the actuators are still actuated mechanically, but by means of the electric motors 8. In this example the electric motors 8 are in the form of servomotors 8, and this makes it possible, from the known set position of the servomotors 8, to reach a conclusion about the position of the actuators and hence about the gears engaged. Since this information is transmitted to an appropriately designed transmission control unit (diagrammatically shown in FIG. 3) which controls the electric motors 8, an erroneous operation of the power take-off transmission can be reliably prevented. Furthermore, the operating comfort of the power take-off transmission 1 in FIG. 2a is substantially greater compared with the power take-off transmission 1 of FIG. 1a, since it provides the same functionality as a known but much more expensive electro-hydraulically actuated power take-off transmission. FIG. 3 diagrammatically shows an electric motor 8 which, in one embodiment, is equipped with a position-determining sensor 14 that allows checking the angular (rotational) position of the motor shaft. The rotational position of the motor shaft determined by the sensor 14 is continuously transmitted to an electronic control unit 16 that can be integrated in a transmission control unit 18 of the power take-off transmission 1. The transmission control unit 18 is designed to read a set position of the electric motor 8. Thus, there is no need for separate sensors for detecting the position of the at least one actuator 12, since the position of the at least one actuator 12 can be determined from the set position of the electric motor 8. In turn, from the position of the at least one actuator 12, the respective engaged gear 10 or an engaged neutral position can advantageously be determined.

INDEXES

1 Power take-off transmission
2 Driving transmission
3 Transmission housing
4 Drive output shaft
5 Power take-off shaft
6 Actuating linkage
7 Lever
8 Electric motor

The invention claimed is:

1. A power take-off transmission for a motor vehicle comprising:
   a power take-off shaft;
   a transmission housing which houses the power-take off transmission and a drive transmission, the power take-off shaft and at least one drive output shaft extending from the transmission housing;
   at least two shiftable gears, each of the at least two shiftable gears being shiftable to an engaged position and a neutral position;
   at least one actuator being arranged within the transmission housing for engaging the at least two shiftable gears, the at least one actuator having an actuating linkage;
   the actuating linkage extending from inside the transmission housing to an electric motor, the actuating linkage being coupled to the electric motor which is located outside the transmission housing and supported on the transmission housing, the actuating linkage being rotatably driven by rotation of the electric motor and the at least one actuator being mechanically actuatable by rotation of the actuating linkage to selectively shift the at least two shiftable gears to the engaged and the neutral positions;
   an electronic control unit being integrated into a transmission control unit of the power take-off transmission;
   the electric motor communicating with the electronic control unit, and the electronic control unit being configured to continuously detect rotational positions of the electric motor;
   the electronic control unit being configured to determine that one of the at least two shiftable gears is shifted to the engaged position based on a detection that the electric motor is rotated to a first set position, and to determine that the one of the at least two shiftable gears is shifted to the neutral position based on a detection that the electric motor is rotated to a second set position, and the electronic control unit being configured to control shifting of the at least two shiftable gears by controlling rotation of the electric motor based on the rotational positions of the electric motor, and the electronic control unit being configured to automatedly rotate the power take-off shaft by controlling rotation of the electric motor based on a rotational position of the electric motor.

2. The power take-off transmission according to claim 1, wherein the electric motor is a servomotor.

3. The power take-off transmission according to claim 1, wherein the transmission control unit is configured to control the electric motor and to control the drive transmission, the transmission control unit being configured to selectively prevent shifting processes based on the engaged position and the neutral position of the at least two shiftable gears.

4. The power take-off transmission according to claim 3, wherein the transmission control unit is configured to read the rotational positions of the electric motor and to automatedly rotate the power take-off shaft to a coupling orientation of the power take-off shaft.

5. The power take-off transmission according to claim 3, wherein the transmission control unit is configured to selectively prevent certain shifting processes of the power take-off transmission based on the rotational position of the electric motor.

6. The power take-off transmission according to claim 1, wherein the actuating linkage is configured to either rotationally actuate or translationally actuate the actuator.

7. The power take-off transmission according to claim 1, wherein the power take-off transmission has four gears, two actuators, two actuating linkages and two electric motors.

8. The power take-off transmission according to claim 1, wherein the drive transmission is arranged in the transmission housing together with the power take-off transmission, and the transmission control unit of the power take-off transmission comprises a transmission control unit of the drive transmission.

9. The power take-off transmission according to claim 1, wherein the power take-off transmission can be used alternatively as either a power take-off and as a trunnion shaft.

10. An agricultural working machine comprising:
    a power take-off transmission having a power take-off shaft;
    a transmission housing which houses the power-take off transmission and a drive transmission, the power take-off shaft and at least one drive output shaft extending from the transmission housing;
    at least two shiftable gears, each of the at least two shiftable gears being shiftable to an engaged position and a neutral position;
    at least one actuator for shifting the at least two shiftable gears, the at least one actuator being arranged within the transmission housing;
    the at least one actuator having an actuating linkage that is arranged within the transmission housing for mechanical actuation of the at least one actuator from outside the transmission housing;
    the actuating linkage extending to an electric motor located outside the transmission housing, the actuating linkage being coupled to the electric motor, the electric motor being supported on the transmission housing, the actuating linkage being rotated by rotation of the electric motor, and rotation of the actuating linkage mechanically actuates the at least one actuator;
    the electric motor communicating with an electronic control unit, and the electronic control unit being configured to continuously detect rotational positions of the electric motor, the electronic control unit being integrated into a transmission control unit of the power take-off transmission; and
    the electronic control unit being configured to determine that one of the at least two shiftable gears is shifted to the engaged position based on a detection that the electric motor is rotated to a first set position, and to determine that the one of the at least two shiftable gears is shifted to the neutral position based on a detection that the electric motor is rotated to a second set position, and the electronic control unit being configured to control shifting of the at least two shiftable gears and to automatedly rotate the power take-off shaft by controlling rotation of the electric motor based on a detected rotational position of the electric motor.

\* \* \* \* \*